US012671635B2

(12) United States Patent
Parker et al.

(10) Patent No.: US 12,671,635 B2
(45) Date of Patent: *Jun. 30, 2026

(54) END-TO-END INTENT DEFINITION OF NETWORK FUNCTIONS FOR NETWORK SLICE MANAGEMENT

(71) Applicant: Microsoft Technology Licensing, LLC, Redmond, WA (US)

(72) Inventors: Ronald Mark Parker, Manchester, MA (US); Michael Anthony Brown, McKinney, TX (US); Bahareh Sadeghi, Vancouver, WA (US); Mark Gordon Libby, Groton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

This patent is subject to a terminal disclaimer.

(21) Appl. No.: 18/604,028

(22) Filed: Mar. 13, 2024

(65) Prior Publication Data

US 2024/0297832 A1      Sep. 5, 2024

Related U.S. Application Data

(63) Continuation of application No. 17/741,169, filed on May 10, 2022, now Pat. No. 11,956,131.

(51) Int. Cl.
| | |
|---|---|
| *H04L 41/5054* | (2022.01) |
| *H04L 41/046* | (2022.01) |
| *H04L 41/5041* | (2022.01) |

(52) U.S. Cl.
CPC ........ *H04L 41/5054* (2013.01); *H04L 41/046* (2013.01); *H04L 41/5045* (2013.01); *H04L 41/5048* (2013.01)

(58) Field of Classification Search
None
See application file for complete search history.

(56) References Cited

U.S. PATENT DOCUMENTS

| | | | | |
|---|---|---|---|---|
| 10,057,109 B2 * | 8/2018 | Shatzkamer | ........ | H04L 41/5054 |
| 10,862,711 B2 * | 12/2020 | Koat | ...................... | H04L 67/51 |

(Continued)

OTHER PUBLICATIONS

"5G; System architecture for the 5G System (5GS) (3GPP TS 23.501 version 16.6.0 Release 16)", In ETSI Technical Specification 123 501 V16.6.0 (Oct. 2020), Oct. 2020, 1-450 Pages (Year: 2020).*

*Primary Examiner* — Ranodhi Serrao
(74) *Attorney, Agent, or Firm* — ArentFox Schiff LLP

(57) ABSTRACT

Described are examples for providing end-to-end intent definition of network functions for network slice management. Intents are defined for each level of network constituent including slices, slice subnets, and management functions. A system of intent based network slice management includes a network slice management function (NSMF) configured to receive a service profile from a communication service management function (CSMF) and derive an intent for each desired network slice subnet for a network slice subnet management function (NSSMF). The NSSMF is configured to derive requirements for a plurality of network functions (NFs) and provide an intent defining the requirements of a respective NF to a network function management function (NFMF). The NFMF is configured to receive the intent for the respective NF via an intent-based interface for management of NFs and derive a network resource model (NRM) for the respective NF based on the intent.

17 Claims, 6 Drawing Sheets

(56) References Cited

U.S. PATENT DOCUMENTS

| | | | |
|---|---|---|---|
| 11,051,195 B2 * | 6/2021 | Yao ........................ | H04W 24/10 |
| 2014/0317261 A1 * | 10/2014 | Shatzkamer ........ | G06F 9/45558 |
| | | | 709/223 |
| 2019/0109768 A1 * | 4/2019 | Senarath ............. | H04L 41/5006 |
| 2020/0014561 A1 * | 1/2020 | Koat ................... | H04L 63/0876 |
| 2020/0021487 A1 * | 1/2020 | Yao ........................ | H04L 41/02 |
| 2020/0295990 A1 * | 9/2020 | Nikain ................ | G06F 9/45558 |
| 2020/0296005 A1 * | 9/2020 | Nikain ................ | H04L 41/0895 |
| 2020/0313969 A1 * | 10/2020 | Li ........................ | H04L 41/0806 |
| 2021/0092020 A1 * | 3/2021 | Maguire ................ | H04L 41/40 |
| 2022/0104051 A1 * | 3/2022 | Yao ........................ | H04W 24/10 |
| 2023/0024320 A1 * | 1/2023 | Gautam ................ | H04W 24/04 |

* cited by examiner

END-TO-END INTENT DEFINITION OF NETWORK FUNCTIONS FOR NETWORK SLICE MANAGEMENT

CROSS-REFERENCE TO RELATED APPLICATIONS

This application is a continuation of U.S. patent application Ser. No. 17/741,169 titled "END-TO-END INTENT DEFINITION OF NETWORK FUNCTIONS FOR NET-WORK SLICE MANAGEMENT," filed May 10, 2022, which is assigned to the assignee hereof, and incorporated herein by reference in its entirety.

BACKGROUND

A radio access network (RAN) may provide multiple user devices with wireless access to a mobile network. The user devices may wirelessly communicate with a base station, which forwards the communications towards a core network. A core network may include multiple nodes or functions. For example, a 5G core network may include one or more Access and Mobility Management Functions (AMFs), Session Management Functions (SMFs), and a User Plane Functions (UPFs). For instance, the AMF may be a control node that processes the signaling between the UEs and the core network. Generally, the AMF provides quality of service (QoS) flow and session management. All user Internet protocol (IP) packets are transferred through the UPF. The UPF provides UE IP address allocation as well as other functions. The UPF may be connected to IP Services. The IP Services may include the Internet, an intranet, an IP Multi-media Subsystem, a packet switched (PS) Streaming Service, and/or other IP services.

A virtualized radio access network may utilize datacenters with generic computing resources for performing RAN processing for network functions. For example, instead of performing PHY and MAC layer processing locally on dedicated hardware, a virtualized radio access network may forward radio signals from the radio units to an edge datacenter for processing and similarly forward signals from the edge datacenter to the radio units for wireless transmission. As another example, core network functions may be implemented on generic cloud resources at various datacenters. Because the network datacenters utilize generic computing resources, a virtualized RAN may provide scalability and fault tolerance for network processing. Conventionally, whether using dedicated hardware or more generic computing resources, network configuration has been performed by pushing a network configuration down to lower level management functions until each network function is configured.

In complex systems, such as cellular networks in general and in cloud-based virtualized deployments specifically, multiple vendors may provide network functions. Configuration of network functions may vary per vendor. Interoperability between network functions of different vendors may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method of intent based network slice management, including: receiving a service profile in a form of expectations and contexts from a communication service management function (CSMF); deriving desired network slice attributes and profile characteristics for relevant network slice subnets; deriving requirements for a plurality of network functions (NFs) from the intent for the desired network slice subnet; generating an intent for each NF of the plurality of NFs, the intent for each network function NF including limited information defining the requirements of the respective NF; and deriving a network resource model (NRM) for the respective NF based on the intent for the respective NF.

In some aspects, the techniques described herein relate to a method, wherein the limited information is a partial list of attributes of the NRM that define information object classes (IOC) for expected performance of the respective NF.

In some aspects, the techniques described herein relate to a method, wherein deriving the NRM includes deriving an NF profile specifying configuration of the respective NF based on the partial list of attributes of the NRM.

In some aspects, the techniques described herein relate to a method, wherein deriving the NRM includes refining the partial list of attributes of the NRM using one or more of: local policy, metadata, pluggable logic, or hard coded logic.

In some aspects, the techniques described herein relate to a method, further including translating the NRM for the respective NF to a NF vendor-specific interface by a convergence agent for one of a plurality of NF vendors.

In some aspects, the techniques described herein relate to a method, wherein the convergence agent is configured to: convert the NRM to one or more vendor-specific configuration messages; and provide the one or more vendor-specific configuration messages to the respective NF via the NF vendor-specific interface.

In some aspects, the techniques described herein relate to a method, wherein the requirements for the plurality of NFs include a number and a type of each of the plurality of NFs.

In some aspects, the techniques described herein relate to a system of intent based network slice management, including: a network slice management function (NSMF) configured to: receive a service profile in a form of expectations and contexts from a communication service management function (CSMF); derive desired network slice attributes and profile characteristics for relevant network slice subnets; and communicate an intent for each desired network slice subnet to a network slice subnet management function (NSSMF); the NSSMF, which is configured to: derive requirements for a plurality of network functions (NFs) from the intent for the desired network slice subnet; and provide an intent for each network function of the plurality of NFs to a network function management function (NFMF), the intent for each NF including limited information defining the requirements of a respective NF; and the NFMF, which is configured to: receive the intent for the respective NF via an intent-based interface for management of NFs; and derive a network resource model (NRM) for the respective NF based on the intent.

In some aspects, the techniques described herein relate to a system, wherein the limited information is a partial list of attributes of the NRM that define information object classes (IOCs) for expected performance of the respective NF.

In some aspects, the techniques described herein relate to a system, wherein the NFMF is configured to derive an NF profile specifying configuration of the respective NF based on the partial list of attributes of the NRM.

In some aspects, the techniques described herein relate to a system, wherein the NFMF is configured to refine the partial list of attributes of the NRM using one or more of: local policy, metadata, pluggable logic, or hard coded logic.

In some aspects, the techniques described herein relate to a system, wherein the NFMF includes a convergence agent for each of a plurality of NF vendors, each convergence agent configured to translate the NRM for the respective network function to a NF vendor-specific interface.

In some aspects, the techniques described herein relate to a system, wherein the convergence agent is configured to: convert the NRM to one or more vendor-specific configuration messages; and provide the one or more vendor-specific configuration messages to the respective NF via the NF vendor-specific interface.

In some aspects, the techniques described herein relate to a system, wherein the requirements for the plurality of NFs include a number and a type of each of the plurality of NFs.

In some aspects, the techniques described herein relate to a non-transitory computer-readable medium storing computer-executable code, including code to perform any of the above methods.

In some aspects, the techniques described herein relate to a non-transitory computer-readable medium storing computer-executable code, including code to: receive an intent for a network function (NF) via an intent-based interface for management of NFs, the intent for the network function including limited information defining the requirements of the NF; and derive a network resource model (NRM) for the NF based on the intent.

In some aspects, the techniques described herein relate to a non-transitory computer-readable medium, wherein the limited information is a partial list of attributes of the NRM that define information object classes (IOC) for expected performance of the NF.

In some aspects, the techniques described herein relate to a non-transitory computer-readable medium, wherein the code to derive the NRM includes code to derive a network function profile specifying configuration of the network function based on the partial list of attributes of the NRM.

In some aspects, the techniques described herein relate to a non-transitory computer-readable medium, wherein the code to derive the NRM includes code to refine the partial list of attributes of the NRM using one or more of: local policy, metadata, pluggable logic, or hard coded logic.

In some aspects, the techniques described herein relate to a non-transitory computer-readable medium, further including code defining a convergence agent for each of a plurality of NF vendors, each convergence agent configured to translate the NRM for the NF to a NF vendor-specific interface.

In some aspects, the techniques described herein relate to a non-transitory computer-readable medium, wherein the convergence agent is configured to: convert the NRM to one or more vendor-specific configuration messages; and provide the one or more vendor-specific configuration messages to the NF via the NF vendor-specific interface.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
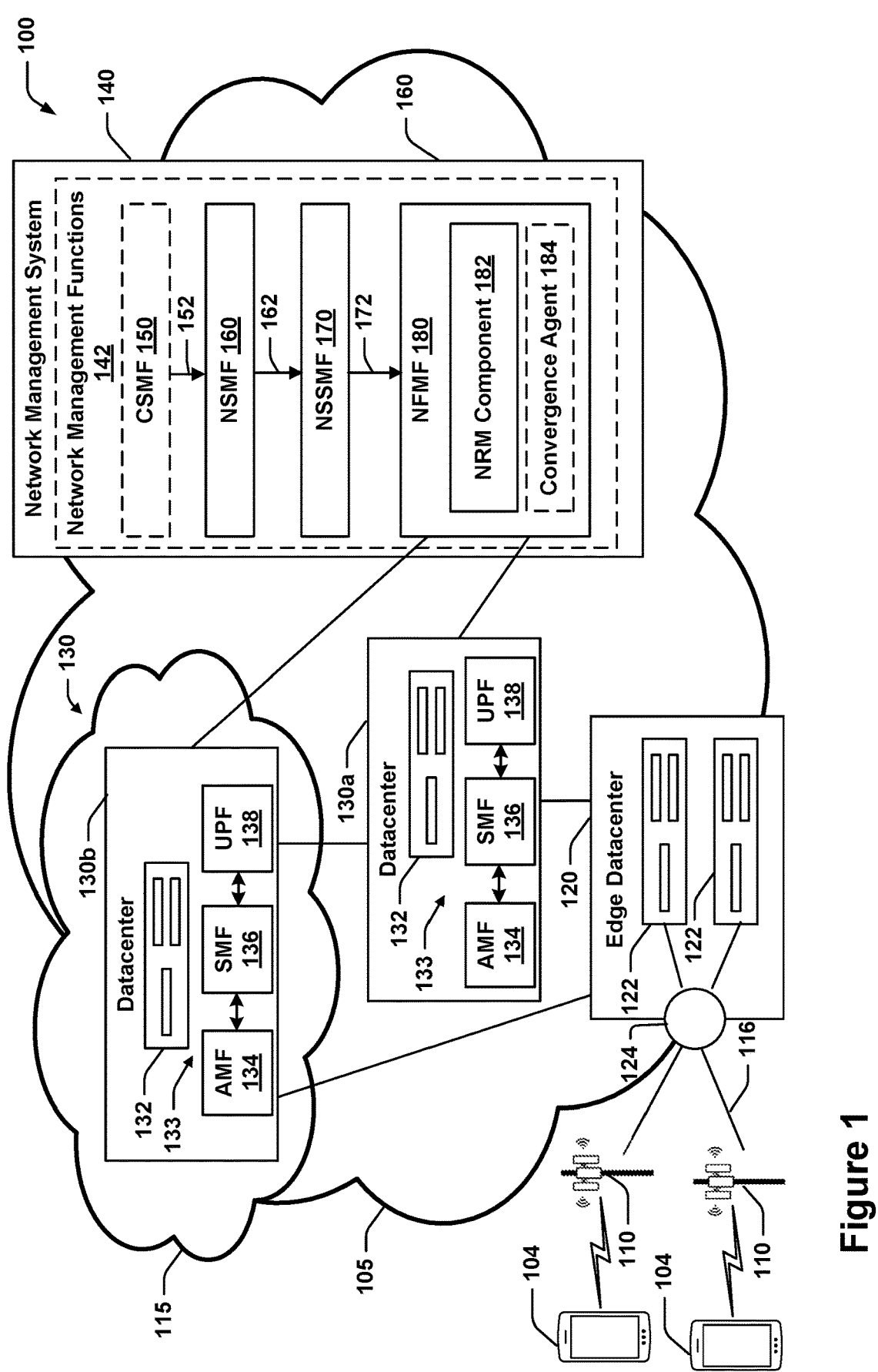
FIG. 1 is a diagram of an example of an architecture for management of a virtualized mobile network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

The concept of intent driven network management allows a client to specify a specific goal (or intent target) to be satisfied within a set of specific expectations (also referred to as contexts). The server, e.g., the intent-handler or the service provider, provides the client with updates regarding the status of the intent. If the server cannot achieve the goal specified as the intent, then the server may reject the intent. If a satisfied intent is degraded and no longer fully satisfied, the server notifies the client of the degradation. The client then may choose to update the intent and set a new goal.

In complex systems, such as cellular networks in general and in cloud-based virtualized deployments specifically, multiple vendors may provide network functions, which may be implemented as embedded systems or software that may be instantiated on computing resources. The concept of intent driven network management may be useful for interoperability between vendors because the goals of an intent may be applicable to any vendor. However, as an intent for a service is pushed closer to instantiation as network functions, the intent must be resolved into an actual configuration of the vendor-specific implementation. It is unlikely that all vendors will agree to a standardized configuration protocol. For example, NETCONF and YANG are currently in use for configuration of network functions. Further, a network may include legacy implementations that do not follow intent-based standards.

In an aspect, this disclosure describes various examples related to network management for virtualized radio access networks (RANs) using intent based interfaces with resolution of a network resource model at a network function management function (NFMF). An intent for a communication service may be defined as a service profile at a communication service management function (CSMF), which may receive input from a human operator. The service profile may be implemented as a network slice, which may include network slice constituents such as a network slice subnet and network functions. A network slice management function (NSMF) may derive network slice attributes and slice profile characteristics for relevant network slice subnets. The NSMF may provide intents for network slice subnets to a network slice subnet management function (NSSMF). The NSSMF may derive requirements for a plurality of NFs from the intent for the desired network slice subnet. The NSSMF may provide an intent for each NF to a NFMF. The intent for each NF may include limited information, for example, less information than a standardized network resource model (NRM) for the NF. The NFMF may receive the intent for an NF and derive an NRM for the NF. In some implementations, the NFMF may include a convergence agent for each of a plurality of NF vendors. The convergence agent may translate the NRM for the NF to a vendor specific interface, which may be an intent-based interface or an imperative configuration interface.

In an aspect, the determination of the NRM by the NFMF may improve network configuration by moving configuration choices closer to the computing resources. The NFMF may optimize the network configuration for performance or cost, for example, while satisfying constraints specified by higher level network management functions. The higher level network management functions may benefit from lower complexity. Further, by including a convergence agent for each of the plurality of NF vendors, the NFMF may improve interoperability and increase the configuration options available to a network operator. For instance, the NFMF may be able to select between multiple vendors to instantiate a NF, for example, based on cost or performance.

Figure 3:
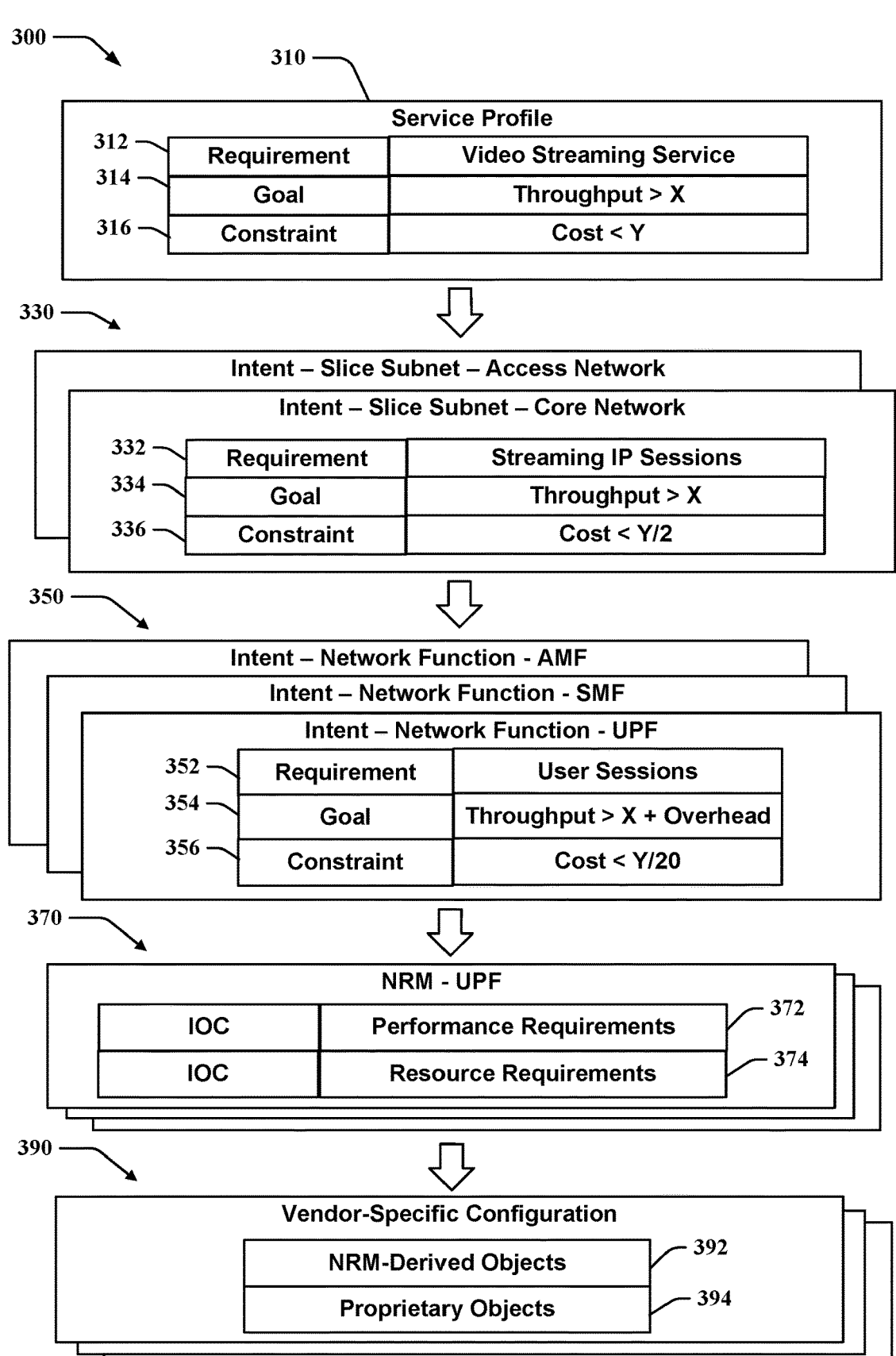
FIG. 3 is diagram of example intents and resource configurations.
Figure 4:
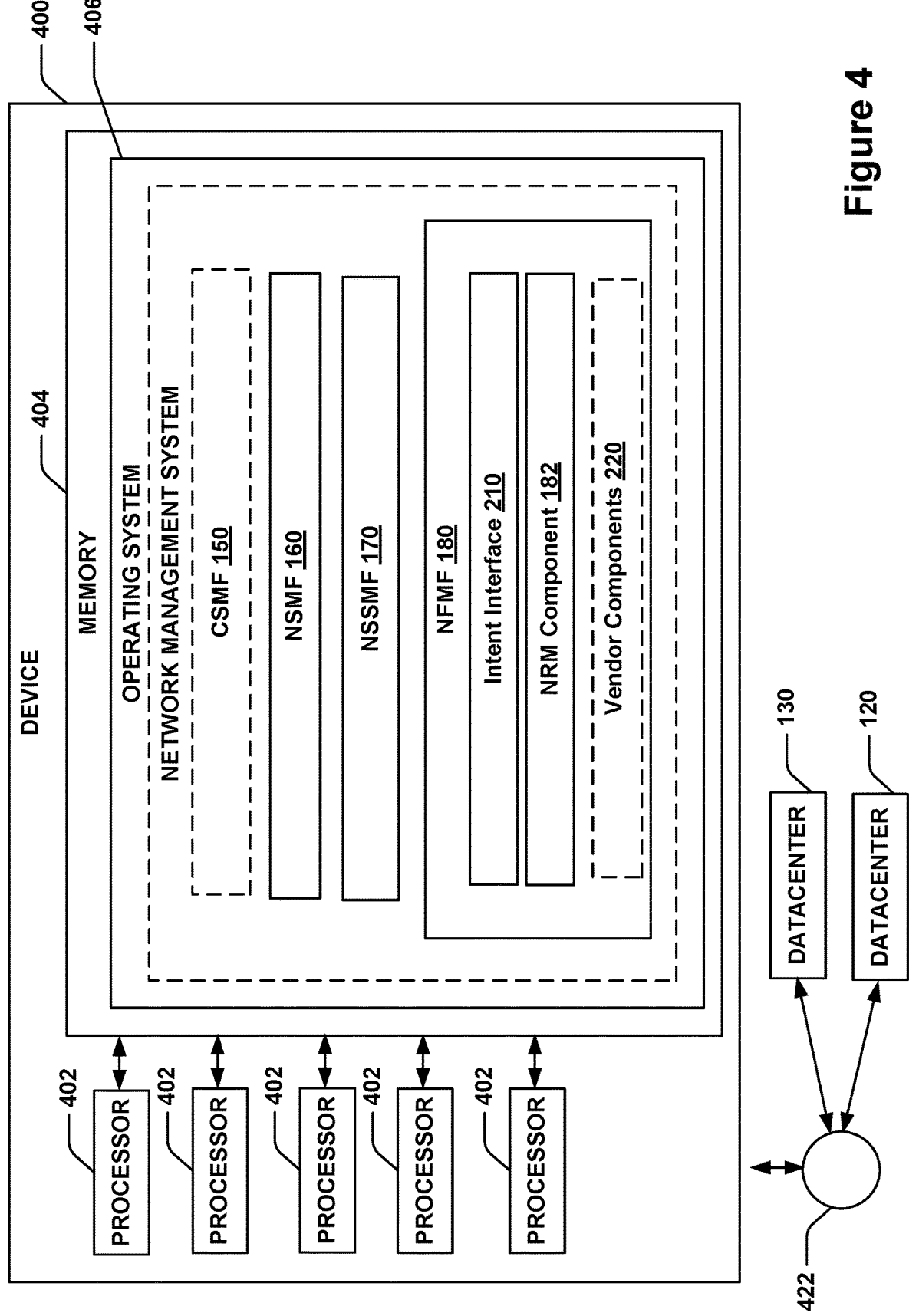
FIG. 4 is a schematic diagram of an example of a device for network configuration.
Figure 5:
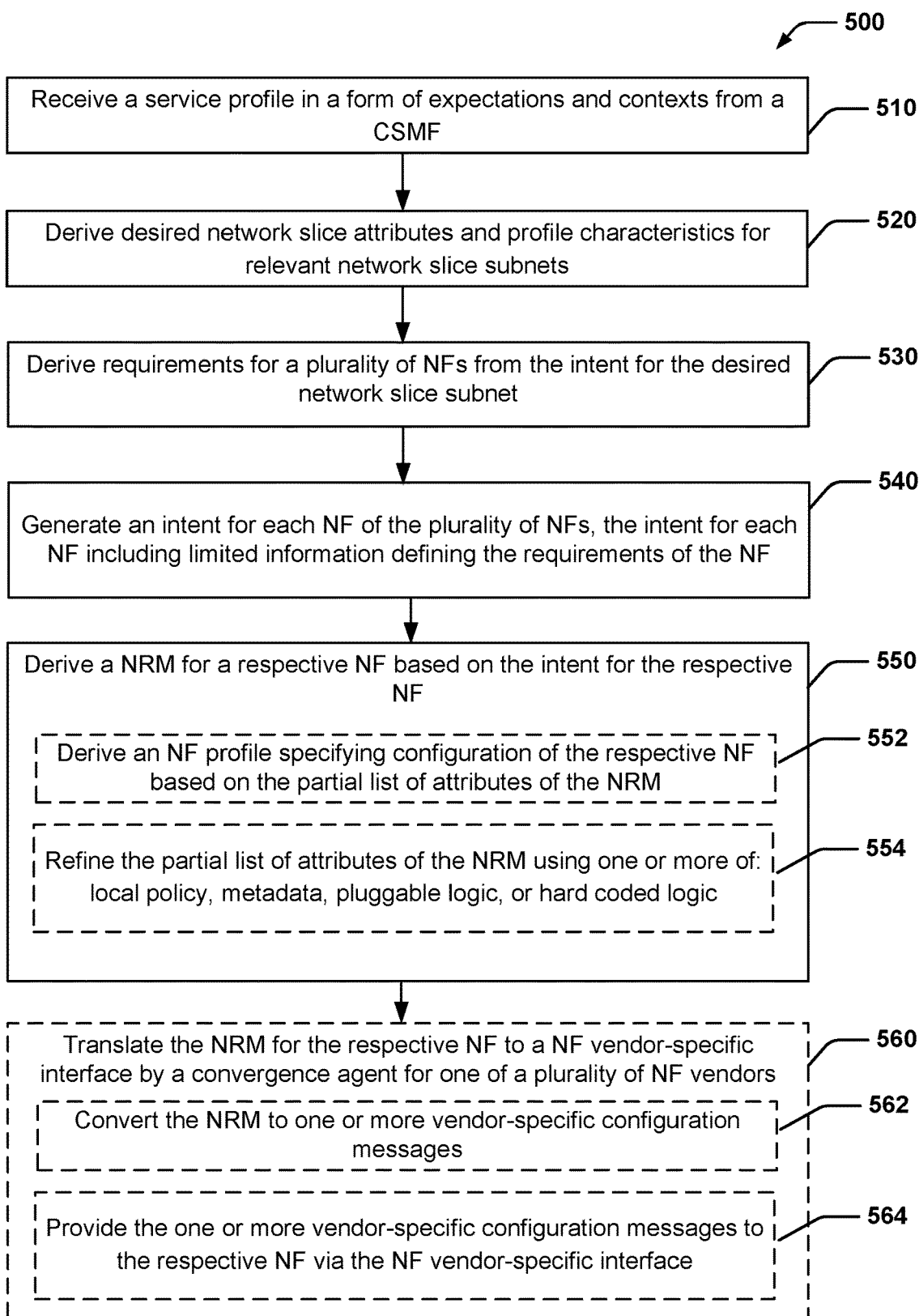
FIG. 5 is a flow diagram of an example of a method for end-to-end intent definition of network functions for network slice management.

Turning now to FIGS. 1-6, examples are depicted with reference to one or more components and one or more methods that may perform the actions or operations described herein, where components and/or actions/operations in dashed line may be optional. Although the operations described below in FIG. 5 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a diagram of an example of an architecture for management of a virtualized RAN 100. The virtualized RAN 100 may be implemented on a cloud network 105 to provide access for user equipment (UEs) 104. The virtualized RAN 100 may include radio units 110, one or more edge datacenters 120, one or more datacenters 130, and a network management system 140. In some implementations, components of the virtual RAN 100 may be provided by different vendors. For example, the cloud network 105 may include a datacenter 130a, but another cloud network 115 may be provided by another cloud vendor and include a datacenter 130b. In an aspect, the network management system 140 may be configured to interface with either cloud vendor.

The radio units 110 may include antennas configured to transmit and/or receive radio frequency (RF) signals. In some implementations, the radio units 110 may include RF processing circuitry. For example, the radio units 110 may be configured to convert the received RF signals to baseband samples and/or convert baseband samples to RF signals. The radio units 110 may be connected to the edge datacenter 120 via front-haul connections 116. The front-haul connections 116 may be wired connections such as fiber optic cables.

The edge datacenter 120 may include computing resources 122 and a switch 124, which may be connected to RUs 110 via the front-haul connections 116. The edge datacenter 120 may provide a virtualized base station for performing RAN processing for one or more cells. For example, the computing resources 122 may be hardware servers or virtual servers. The servers may be generic computing resources that can be configured to perform specific RAN protocol stacks including, for example, physical (PHY) layer, media access control (MAC) layer protocol stacks, radio link control (RLC) layer, and a radio resource control (RRC) layer. In some implementations, PHY layer processing may be more resource intensive than higher layer processing and may benefit from performance close to the RUs 110. The computing resources 122 may be connected to the switch 124 and to each other via connections, which may be wired connections such as Ethernet.

The datacenter 130 may include computing resources 132. Unlike the edge datacenter 120, the datacenter 130 may lack a direct connection to RUs 110. Generally, the datacenter 130 may be more centrally located, be connected to multiple other datacenters, and/or have greater computing resources 132 than an edge datacenter 120. In some implementations, higher layer network functions and/or core network functions may be performed at a datacenter 130. For example, the datacenter 130 may instantiate network functions 133 such one or more Access and Mobility Management Functions (AMFs) 134, a Session Management Function (SMF) 136, and a User Plane Function (UPF) 138. In some aspects, individual network functions may be provided by different vendors. For example, a network function 133 may include an embedded system on hardware located at a datacenter 130a or software executable on generic computing resources of a datacenter 130. The network management system 140 may interface with systems of different vendors to configure a network function.

The network management system 140 may provide a network operator with tools for configuring the virtualized RAN 100. In an aspect, the network management system 140 provides intent based configuration of the virtualized RAN 100. An intent specifies the expectations including requirements, goals, and constraints for a specific service or network management workflow. An intent is typically understandable by humans, and also can be interpreted by a machine without any ambiguity. In contrast to an imperative configuration that specifies how a network or component is to perform, an intent expresses what a network should achieve. For example, an intent may express the metrics that are to be achieved and not how to achieve the metrics.

In an aspect, the network management system 140 includes one or more network management functions 142. In some implementations, network management system 140 includes slice based network management functions 142 that correspond to network slice constituents and are arranged hierarchically. For example, the network management functions 142 may include a communications service management function (CSMF) 150, a network slice management function (NSMF) 160, a network slice subnet management function (NSSMF) 170, and a network function management function (NFMF) 180. The slice based network management functions 142 may manage slice constituents such as a slice, a slice subnet, or a network function (NF). Each network management function 142 may receive an intent for a network slice constituent and output an intent for a lower level slice constituent and/or an imperative configuration.

For example, the CSMF 150 may output an intent 152 for a network slice, the NSMF 160 may output one or more intents 162 for network slice subnets, the NSSMF 170 may output one or more intents 172 for network functions, and the NFMF 180 may output configurations of network functions 133.

In an aspect, the NFMF 180 may include a network resource model (NRM) component 182. A NRM may be a standardized model that defines information object classes (IOC) for the network function. In some implementations, some of the IOCs define expected performance of the network function. Such IOCs may be defined by the intents 172. That is, the intents 172 for network functions may each define limited information for a network function such as the expected performance of the network function. Other IOCs of the NRM may define a configuration of the network function such as compute resources, transport resources, and storage resources. The NRM component 182 may be configured to derive the complete NRM for a network function based on the intent 172 including a partial list of attributes of the NRM. For example, the NRM component 182 may refine the partial list of attributes of the NRM using one or more of: local policy, metadata, pluggable logic, or hard coded logic. In some implementations, the NFMF 180 may optionally include a convergence agent 184 for each of a plurality of NF vendors. Each convergence agent 184 may be configured to translate the NRM for the network function to a NF vendor-specific interface.

In an example, the NFMF 180 may communicate with a datacenter 130 to instantiate a network function 133, configure a policy for the network function 133, and/or monitor performance of the network function 133. In some implementations, the network management system 140 may be implemented on cloud resources of the cloud network 105 such as a datacenter 130a. The network management system 140 may communicate with the cloud network 105 via a cloud/container infrastructure service management (CISM) system. In some implementations, the network management system 140 and the CISM system may be implemented on the same cloud network 105, and there may be a logical divide between the network management system 140 and the CISM system. In other implementations, the network management system 140 may be external to the cloud network 105 or may communicate with a second cloud network 115 and may communicate with a CISM system via a network connection such as a portal provided by the CISM system. In some implementations, the CISM system may be considered a vendor-specific interface, and the network management system 140 may include a convergence agent 184.

Figure 2:
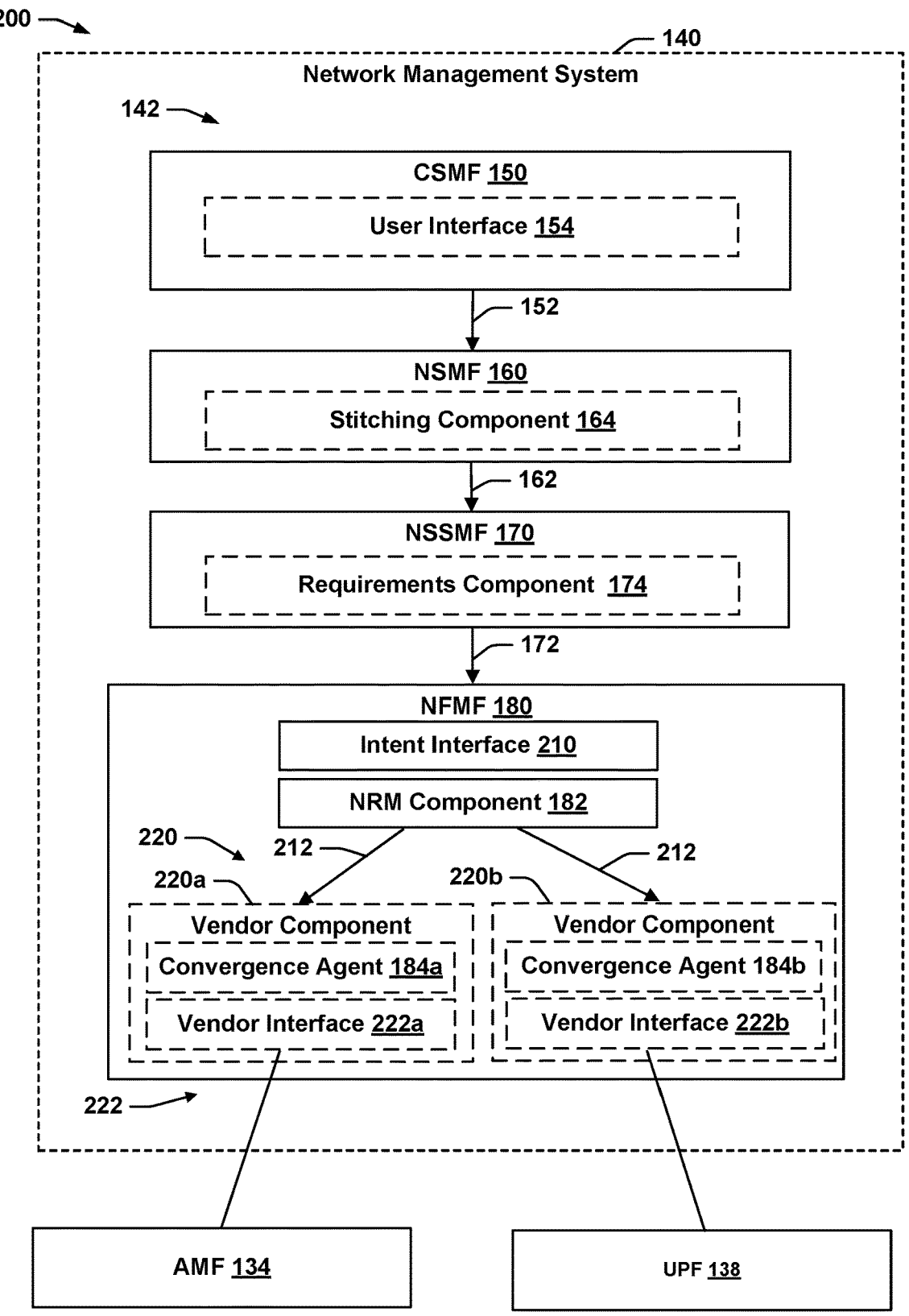
FIG. 2 is a diagram of an example of further details of network slice based management of a virtualized mobile network.

FIG. 2 is a diagram 200 of an example of further details of network slice based management of a virtualized RAN. The network management system 140 may include hierarchical management functions 142. For example, the management functions 142 may include the CSMF 150, the NSMF 160, the NSSMF 170, and the NFMF 180. Each network management function 142 may be an intent based management function that receives an intent from a higher level and generates an intent expectation for a lower level. The NFMF 180 may generate a configuration for a network function.

In an aspect, the CSMF 150 may receive an intent (e.g., for a service) from a network operator and generate an intent 152 for the NSMF 160. The CSMF 150 may include a user interface 154 for receiving the intent 152. The intent 152 may include a service profile in the form of expectations and contexts. For example, the intent 152 may identify a network service and specify expected performance such as a number of devices that may concurrently use the service. Contexts may include identification of geographic regions or subscriber classes for accessing the network service. The CSMF 150 may generate a service profile based on information provided by the network operator.

The NSMF 160 may receive the intent 152 as a new intent for a network slice and generate one or more intents 162 for network slice subnets. The NSMF 160 may include a stitching component 164 configured to stitch together subnets to provide the requested service. The stitching component 164 may derive slice attributes and desired slice profile characteristics for relevant network slice subnets. For example, a mobile video sharing service may require an access network, a core network, and IP services, each of which may be considered a subnet. The stitching component 164 may define boundaries and expected performance of each subnet. The stitching component 164 may generate an intent 162 for each subnet. The NSMF 160 may provide the intents 162 to the NSSMF 170.

The NSSMF 170 may receive the intents 162 and derive requirements for a plurality of network functions from the intent 162 for a network slice subnet. The NSSMF 170 may include a requirements component 174. For instance, the requirements component 174 may map requirements of the intent 162 to corresponding network functions. The requirements component 174 may generate an intent 172 for each network function. The intent 172 may include limited information for the network function. For example, the intent 172 may include IOCs defining expected performance of the network function. The intent 172 may be less than a complete NRM.

The NFMF 180 receive the intent 172 for each network function via an intent interface 210. The NRM component 182 may derive a NRM for the network function based on the intent. As discussed above, the intent 172 may be an incomplete NRM including a partial list of attributes of the NRM, for example, only including ICs defining the expected performance. For example, the NRM component 182 may derive an NF profile specifying configuration of the NF based on the partial list of attributes of the NRM. In some implementations, the NRM component 182 may be configured to refine the partial list of attributes of the NRM using one or more of: local policy, metadata, pluggable logic, or hard coded logic.

In some implementations, the NRM may serve as a configuration for a network function. That is, an NF may be configured to receive a standardized NRM. In other implementations, however, the NFMF 180 may include a plurality of vendor components 220 for adapting the NRM to a specific vendor interface or requirement for a NF. A vendor component 220 may include a convergence agent 184 and a NF vendor-specific interface 222 that is specific to the vendor and/or the particular NF. For instance, if the same vendor provides software NFs for each core NF, the vendor component 220a may include a different convergence agent 184 or vendor interface for each software NF. The convergence agent 184 may be configured to convert a standardized NRM to one or more vendor-specific configuration messages. The convergence agent 184 may include local policy, metadata, pluggable logic, or hard coded logic to convert IOCs of the NRM to fields of the vendor-specific configuration messages. The convergence agent 184 may also derive missing fields of the vendor-specific configuration messages. In some implementations, if the vendor NF includes an order dependency requiring configuration messages or objects of the NRM in a certain order, the convergence agent 184 may order the configuration messages. The convergence agent 184 may provide the one or more vendor-specific configuration messages to a respective NF via the NF vendor-specific interface 222. For example, the NF vendor-specific interface 222 may be an API provided by the vendor.

In an example, referring back to FIG. 1, the NFMF 180 may determine that an AMF 134 should be instantiated on the cloud network 105 (e.g., at the datacenter 130*a*) and a UPF 138 should be instantiated on the cloud network 115 (e.g., at the datacenter 130*b*). Accordingly, the AMF 134 and the UPF 138 may be provided by different vendors. The NFMF 180 may generate the NRM 212 for each network function. The vendor component 220*a* may include a convergence agent 184*a* that converts the NRM to a vendor-specific configuration message for the cloud network 105 and provides the vendor-specific configuration message to the datacenter 130*a* via the NF vendor-specific interface 222*a*. Similarly, the vendor component 220*b* may include a convergence agent 184*b* that converts the NRM to a vendor-specific configuration message for the cloud network 115 and provides the vendor-specific configuration message to the datacenter 130*b* via the NF vendor-specific interface 222*b*.

FIG. 3 is diagram 300 of example intents and resource configurations. For instance, the intent 310 may correspond to the intent 152 for a network slice received at the NSMF 160, the intents 330 may correspond to the intent 162 for a networks slice subnet received at the NSSMF 170, and the intents 350 may correspond to the intent 172 for an NF. The resource configurations may include a NRM 370 and a vendor-specific configuration 390.

The intent 310 may include an expectation that includes requirements 312, goals 314, and constraints 316. For example, the intent 310 may be an intent for establishing an internet service such as a video streaming service as indicated by the requirement 312. The intent 310 may be generated by the CSMF 150. The intent 310 may have a goal of achieving a throughput greater than X, which may be selected by a network operator via the user interface 154. The intent 310 may have a constraint 316 of a cost less than Y, which may also be selected by the network operator via the user interface 154. In some implementations, a context provides information that filters and identifies desired objects. For example, an expectation may only be applicable to objects based on a specified context.

The intents 330 may include intents for different subnets that may be stitched together to provide end-to-end service for a network slice. For example, subnets may include an access network subnet and a core network subnet. In some implementations, for example, a network operator may control an access network and want to add a virtualized core network to support a specific service. In other implementations, a virtualized access subnet may be stitched to a virtualized core subnet, or access and core functions may be considered a single subnet. As illustrated, a requirement 332 for a core network may be to provide IP streaming services (e.g., from a streaming server to the core network). The goal 334 may be derived from the goal 314. For example, a total throughput for the service in the core network may be the same as the throughput as a whole. Similarly, the constraints 336 may be derived from the constraints 316. For instance, a cost may be apportioned between the subnets according to a configured policy.

The intents 350 may include intents for individual network functions within a subnet for providing the service. For example, a core network subnet may include an intent 350 for each of an AMF 134, SMF 136, and UPF 138. The intents 350 may specify high level requirements 352 for a network function. Consistent with the concept of an intent, the intents 350 may specify what the network function is to achieve without specifying how the network function is to achieve the requirement. In contrast, an NRM conventionally used for network configuration may include IOCs that specify both performance requirements and resource requirements. Accordingly, the intents 350 may be seen as partial NRMs that include a partial list of attributes of the NRM that define IOCs for expected performance of the network function. For instance, the UPF 138 may provide user sessions. The goals 354 may be derived from the goal 334. For example, the throughput for user sessions may be the total requested throughput plus overhead for signaling, which may be defined by policy at the NSSMF 170. Similarly, the constraints 356 may be derived from the constraints 336, for example, by further apportioning a cost among network functions according to a policy.

The NRM 370 may include a set of IOCs for a network function. As discussed above, the intent for a network function may be a partial NRM including, for example, IOCs for performance requirements 372. A complete et of IOCs for a network function may be referred to as an NF profile. The NFMF 180 and/or the NRM component 182 may be configured to derive an NF profile specifying configuration of the NF based on the partial list of attributes of the NRM. For example, the NRM component 182 may derive resource requirements 374 based on the performance requirements 372 using one or more of: local policy, metadata, pluggable logic, or hard coded logic.

The vendor-specific configuration 390 may be defined by a specific vendor. The vendor component 220 and/or the convergence agent 184 may be configured to convert the NRM 370 to one or more vendor-specific configuration 390 messages. In some implementations, a vendor-specific configuration 390 may include NRM-derived objects 392 and proprietary objects 394. The NRM-derived objects 392 may be translated from IOCs of the NRM 370. The proprietary objects 394 may be generated based on logic defined by the convergence agent 184.

FIG. 4 is a schematic diagram of an example of a device 400 (e.g., a computing device) for network configuration. The device 400 may be an example of a computing resource 132 such as a server at a datacenter 130 that hosts the network management system 140. The device 400 is connected to other servers within the datacenter via a switch 422 and may be connected to servers at other datacenters.

In an example, device 400 can include one or more processors 402 and/or memory 404 configured to execute or store instructions or other parameters related to providing an operating system 406, which can execute one or more applications or processes, such as, but not limited to, a network management system 140 including at least one network management function 142. In some implementations, the network management system 140 includes each of the CSMF 150, NSMF 160, NSSMF 170, and NFMF 180. In other implementations, one or more of the network management functions 142 may be instantiated on a different device and communicate with the other network management functions 142 via a network connection and an intent interface. For example, the CSMF 150 may be implemented as a separate device (e.g., a network operator device) that generates the intent 310 and communicates with the NSMF 160 via a network interface.

In an example, processor 402 and memory 404 may be separate components communicatively coupled by a bus (e.g., on a motherboard or other portion of a computing device, on an integrated circuit, such as a system on a chip (SoC), etc.), components integrated within one another (e.g., processor 402 can include the memory 404 as an on-board component), and/or the like. Memory 404 may store instructions, parameters, data structures, etc. for use/execution by processor 402 to perform functions described herein.

In an example, the network management system 140 includes the NFMF 180 that is configured to generate a NRM 370 for an imperative network configuration of a network function. The NFMF 180 may include the intent interface 210 and the NRM component 182. The NFMF 180 may optionally include one or more vendor components 220.

FIG. 5 is a flow diagram of an example of a method 500 for end-to-end intent definition of network functions for network slice management. Intents may be defined for each level of network constituent including slices, slice subnets, and management functions. At the NFMF level, the intents for network functions may be used to derive imperative configurations of the network functions. For example, the method 500 can be performed by a device 400 and/or one or more components thereof to instantiate one or more network functions 133 within a cloud network 105 to provide a network service. For instance, the method 500 may be performed by a device implementing any of a CSMF 150, an NSMF 160, NSSMF 170, or a NFMF 180.

At block 510, the method 500 includes receiving a service profile in a form of expectations and contexts from a CSMF. In an example, the NSMF 160, e.g., in conjunction with processor 402, memory 404, and operating system 406, can receive a service profile (e.g., intent 310) in a form of expectations and contexts from a CSMF 150.

At block 520, the method 500 includes deriving desired network slice attributes and profile characteristics for relevant network slice subnets. In an example, the NSMF 160 and/or stitching component 164, e.g., in conjunction with processor 402, memory 404, and operating system 406, can derive one or more intents 330 including desired network slice attributes and profile characteristics for relevant network slice subnets.

At block 530, the method 500 includes deriving requirements for a plurality of NFs from the intent for the desired network slice subnet. In an example, the NSSMF 170 and/or the requirements component 174, e.g., in conjunction with processor 402, memory 404, and operating system 406, can derive requirements 352 for a plurality of NFs from the intent 330 for the desired network slice subnet.

At block 540, the method 500 includes generating an intent for each network function of the plurality of network functions, the intent for each network function including limited information defining the requirements of the network function. In an example, the NSSMF 170 and/or the requirements component 174, e.g., in conjunction with processor 402, memory 404, and operating system 406, can generate the intent 350 for each NF of the plurality of NFs, the intent 350 for each network function including limited information defining the requirements 352 of the NF.

At block 550, the method 500 includes deriving a NRM for a respective NF based on the intent for the respective NF. In an example, the NFMF 180 and/or NRM component 182, e.g., in conjunction with processor 402, memory 404, and operating system 406, can derive the NRM 370 for a respective NF (e.g., UPF 138) based on the intent 350 for the respective NF. In some implementations, the limited information is a partial list of attributes of the NRM that define IOCs for expected performance (e.g., performance requirements 372) of the respective NF. For example, in some implementations, at sub-block 552, the block 550 may optionally include deriving an NF profile specifying configuration (e.g., resource requirements 374) of the respective NF based on the partial list of attributes of the NRM 370. At sub-block 554, the block 550 may optionally include refining the partial list of attributes of the NRM using one or more of: local policy, metadata, pluggable logic, or hard coded logic.

At block 560, the method 500 includes translating the NRM for the respective NF to a NF vendor-specific interface by a convergence agent for one of a plurality of NF vendors. In an example, the NFMF 180, e.g., in conjunction with processor 402, memory 404, and operating system 406, can translate the NRM 370 for the respective NF to a NF vendor-specific interface 222 by a convergence agent 184 for one of a plurality of NF vendors. For example, in some implementations, at sub-block 562, the block 560 may optionally include converting the NRM 370 to one or more vendor-specific configuration 390 messages. At sub-block 564, the block 560 may optionally include providing the one or more vendor-specific configuration 390 messages to the respective NF (e.g., UPF 138) via the NF vendor-specific interface 222.

Figure 6:
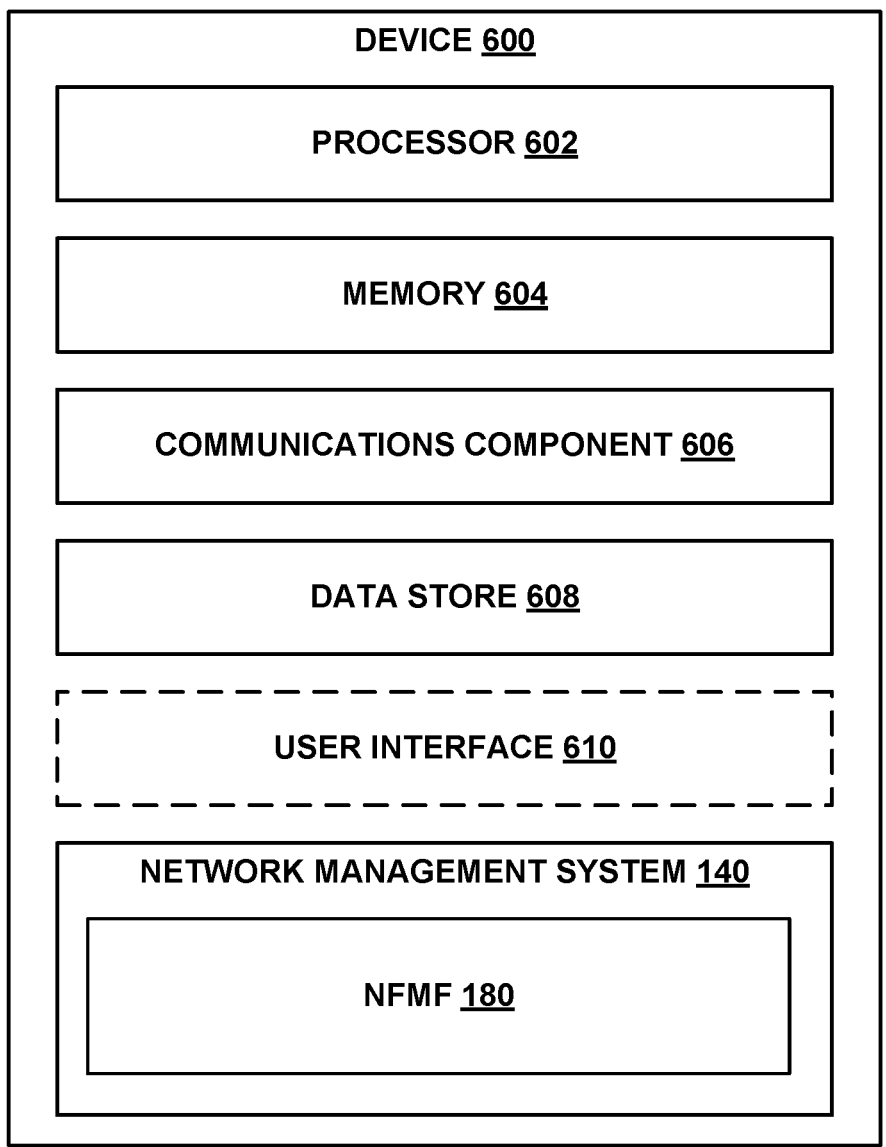
FIG. 6 illustrates an example of a device including additional optional component details as those shown in FIG. 4.

FIG. 6 illustrates an example of a device 600 including additional optional component details as those shown in FIG. 4. In one aspect, device 600 may include processor 602, which may be similar to processor 402 for carrying out processing functions associated with one or more of components and functions described herein. Processor 602 can include a single or multiple set of processors or multi-core processors. Moreover, processor 602 can be implemented as an integrated processing system and/or a distributed processing system.

Device 600 may further include memory 604, which may be similar to memory 404 such as for storing local versions of operating systems (or components thereof) and/or applications being executed by processor 602, such as the network management system 140, etc. Memory 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc. utilizing hardware, software, and services as described herein. Communications component 606 may carry communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with aspects described herein. For example, data store 608 may be or may include a data repository for operating systems (or components thereof), applications, related parameters, etc.) not currently being executed by processor 602. In addition, data store 608 may be a data repository for network management system 140, etc.

Device 600 may optionally include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Device 600 may additionally include a network management system 140 for end-to-end intent definition of network functions for network slice management, etc., as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Non-transitory computer-readable media excludes transitory signals. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the claim language. Reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of intent based network slice management, comprising:

receiving an intent for a respective network function (NF) via an intent-based interface for management of NFs, the intent for the network function including limited information defining requirements of the NF;

deriving a network resource model (NRM) for the respective NF based on the intent for the respective NF, wherein the NRM defines information object classes (IOCs) for expected performance of the respective NF and IOCs for a configuration of the respective NF; and translating the NRM for the respective NF to a NF vendor-specific interface by a convergence agent for one of a plurality of NF vendors, wherein the convergence agent is configured to:

convert the NRM to one or more vendor-specific configuration messages; and provide the one or more vendor-specific configuration messages to the respective NF via the NF vendor-specific interface.

2. The method of claim 1, wherein the limited information is a partial list of attributes of the NRM that define information object classes (IOC) for expected performance of the respective NF.

3. The method of claim 2, wherein deriving the NRM comprises deriving an NF profile specifying configuration of the respective NF based on the partial list of attributes of the NRM.

4. The method of claim 3, wherein deriving the NRM comprises refining the partial list of attributes of the NRM using one or more of: local policy, metadata, pluggable logic, or hard coded logic.

5. The method of claim 1, wherein the requirements for the plurality of NFs include a number and a type of each of the plurality of NFs.

6. The method of claim 1, wherein the NF vendor-specific interface is a cloud infrastructure service management system interface or a container infrastructure service management system interface.

7. A system of intent based network slice management, comprising:

one or more memories, individually or in combination, having computer-executable instructions stored thereon; and one or more processors, individually or in combination, configured to execute the computer-executable instructions to instantiate:

a network function management function (NFMF) configured to:

receive an intent for a respective network function (NF) via an intent-based interface for management of NFs, the intent for the network function including limited information defining requirements of the NF; and derive a network resource model (NRM) for the respective NF based on the intent, wherein the NRM defines information object classes (IOCs) for expected performance of the respective NF and IOCs for a configuration of the respective NF; and define a convergence agent for each of a plurality of NF vendors, each convergence agent configured to translate the NRM for the NF to a NF vendor-specific interface, wherein the convergence agent is configured to:

convert the NRM to one or more vendor-specific configuration messages; and provide the one or more vendor-specific configuration messages to the respective NF via the NF vendor-specific interface.

8. The system of claim 7, wherein the limited information is a partial list of attributes of the NRM that define information object classes (IOCs) for expected performance of the respective NF.

9. The system of claim 8, wherein the NFMF is configured to derive an NF profile specifying configuration of the respective NF based on the partial list of attributes of the NRM.

10. The system of claim 8, wherein the NFMF is configured to refine the partial list of attributes of the NRM using one or more of: local policy, metadata, pluggable logic, or hard coded logic.

11. The system of claim 7, wherein the requirements for the plurality of NFs include a number and a type of each of the plurality of NFs.

12. The system of claim 7, wherein the NF vendor-specific interface is a cloud infrastructure service management system interface or a container infrastructure service management system interface.

13. A non-transitory computer-readable medium storing computer-executable code, comprising code to:

receive an intent for a network function (NF) via an intent-based interface for management of NFs, the intent for the network function including limited information defining requirements of the NF;

derive a network resource model (NRM) for the NF based on the intent, wherein the NRM defines information object classes (IOCs) for expected performance of the respective NF and IOCs for a configuration of the respective NF; and define a convergence agent for each of a plurality of NF vendors, each convergence agent configured to translate the NRM for the NF to a NF vendor-specific interface, wherein the convergence agent is configured to:

convert the NRM to one or more vendor-specific configuration messages; and provide the one or more vendor-specific configuration messages to the NF via the NF vendor-specific interface.

14. The non-transitory computer-readable medium of claim 13, wherein the limited information is a partial list of attributes of the NRM that define information object classes (IOC) for expected performance of the NF.

15. The non-transitory computer-readable medium of claim 14, wherein the code to derive the NRM comprises code to derive a network function profile specifying configuration of the network function based on the partial list of attributes of the NRM.

16. The non-transitory computer-readable medium of claim 14, wherein the code to derive the NRM comprises code to refine the partial list of attributes of the NRM using one or more of: local policy, metadata, pluggable logic, or hard coded logic.

17. The non-transitory computer-readable medium of claim 13, wherein the NF vendor-specific interface is a cloud infrastructure service management system interface or a container infrastructure service management system interface.

* * * * *